(12) United States Patent
Koeske

(10) Patent No.: US 8,733,743 B2
(45) Date of Patent: May 27, 2014

(54) GAS SPRING PISTON, GAS SPRING ASSEMBLY AND METHOD

(75) Inventor: Paul P. Koeske, Fishers, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 197 days.

(21) Appl. No.: 12/977,492

(22) Filed: Dec. 23, 2010

(65) Prior Publication Data

US 2012/0161375 A1 Jun. 28, 2012

(51) Int. Cl.
*F16F 9/04* (2006.01)
(52) U.S. Cl.
USPC ..................................... 267/64.27; 267/64.23
(58) Field of Classification Search
USPC ........... 267/64.19, 64.23, 64.27, 64.21, 61.24
See application file for complete search history.

(56) References Cited

U.S. PATENT DOCUMENTS

| | | | | |
|---|---|---|---|---|
| 4,174,827 A | * | 11/1979 | Hirtreiter et al. | 267/64.27 |
| 4,899,995 A | | 2/1990 | Hoffman et al. | |
| 4,946,144 A | * | 8/1990 | Geno et al. | 267/64.27 |
| 5,535,994 A | * | 7/1996 | Safreed, Jr. | 267/64.27 |
| 5,671,907 A | * | 9/1997 | Arnold | 267/64.27 |
| 6,386,524 B1 | * | 5/2002 | Levy et al. | 267/64.27 |
| 6,439,550 B1 | * | 8/2002 | Koch | 267/64.23 |
| 6,942,201 B2 | * | 9/2005 | Leonard | 267/64.27 |
| 7,226,044 B2 | * | 6/2007 | Stoter et al. | 267/64.27 |
| 8,220,785 B2 | * | 7/2012 | Bank et al. | 267/64.27 |
| 8,231,113 B2 | * | 7/2012 | Grabarz et al. | 267/64.27 |
| 2002/0041063 A1 | * | 4/2002 | Crabtree et al. | 267/64.27 |
| 2007/0096374 A1 | * | 5/2007 | Scholz | 267/64.27 |
| 2007/0114706 A1 | * | 5/2007 | Myers | 267/64.27 |
| 2009/0057967 A1 | * | 3/2009 | Koeske et al. | 267/118 |
| 2009/0302514 A1 | * | 12/2009 | Grabarz et al. | 267/64.27 |
| 2010/0096786 A1 | * | 4/2010 | Orlamunder et al. | 267/64.27 |
| 2011/0266728 A1 | * | 11/2011 | Bank | 267/64.27 |
| 2012/0205844 A1 | * | 8/2012 | Koeske et al. | 267/122 |
| 2012/0267836 A1 | * | 10/2012 | Street et al. | 267/64.27 |

FOREIGN PATENT DOCUMENTS

| | | |
|---|---|---|
| DE | 10 2008 055 511 A1 | 6/2010 |
| EP | 0 306 732 A2 | 3/1989 |
| EP | 0 319 448 A2 | 6/1989 |
| EP | 0 859 165 A1 | 8/1998 |
| GB | 2 134 212 A | 8/1984 |

OTHER PUBLICATIONS

International Search Report.

* cited by examiner

*Primary Examiner* — Thomas Irvin
(74) *Attorney, Agent, or Firm* — Jason A. Houser; Fay Sharpe LLP

(57) ABSTRACT

A gas spring piston includes a piston body with an end wall and a side wall that projects longitudinally from the end wall. The side wall includes an outer surface and a retainment ridge spaced longitudinally from the end wall such that the outer surface is disposed between the retainment ridge and the end wall. The retainment ridge projects radially-outwardly beyond the outer surface such that a shoulder surface is formed adjacent the outer surface. The outer surface includes an engagement feature that is dimensioned to compressively engage an associated flexible wall. The engagement feature is positioned along the outer surface in spaced relation to the end wall and the shoulder surface of the retainment ridge. A gas spring assembly and a method of assembling a gas spring that include such a gas spring piston are also disclosed.

18 Claims, 3 Drawing Sheets

GAS SPRING PISTON, GAS SPRING ASSEMBLY AND METHOD

BACKGROUND

The subject matter of the present disclosure broadly relates to the art of spring devices and, more particularly, to a gas spring piston that includes a feature for locating a mounting bead of an associated flexible wall along the gas spring piston. The subject matter of the present disclosure also relates to a gas spring assembly and a method of assembling a gas spring that include such a gas spring piston.

The subject matter of the present disclosure may find particular application and use in conjunction with suspension systems of wheeled vehicles, and may be described herein with particular reference thereto. However, it is to be appreciated that the subject matter of the present disclosure is also amenable to use in other applications and environments, and that the specific uses shown and described herein are merely exemplary. For example, the subject matter of the present disclosure could be used in support structures, height adjusting systems and actuators associated with industrial machinery, components thereof and/or other such equipment.

Wheeled motor vehicles of most types and kinds include a sprung mass, such as a body or chassis, for example, and an unsprung mass, such as an axle or other wheel-engaging member, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

In many applications and uses associated with wheeled motor vehicles, the suspension system of the vehicle is adapted and arranged such that there are substantially no operating conditions, during normal usage, under which the plurality of spring devices would be tensioned or otherwise undergo a tension load. That is, the configuration and/or use of conventional suspension systems is such that the spring devices are not tensioned under during rebound motion and are generally used in compression under normal operating conditions. In such operating environments, it is possible to utilize a gas spring assembly that has a simplified construction and minimal retention of the flexible wall on the piston of the gas spring assembly in the direction opposite that associated with normal use.

As a more-specific example, a construction can be used in which an open end of the flexible wall thereof is "snapped-on" or otherwise press-fit onto the piston of the gas spring assembly. It will be appreciated that such "snap-on" constructions can result in lower cost gas spring assemblies, such as, for example, because a reduced number of components could be used and/or because simplified assembly and other manufacturing techniques could be employed.

This "snap-on" interengagement between the open end of the flexible wall and a portion of the piston normally provides sufficient retention for handling and installation purposes. However, such constructions are often deemed to be poorly suited for applications in which the gas spring assembly could be stretched or otherwise placed in tension, as this could generate an undesirable separation between the flexible wall and the piston of the gas spring assembly.

As such, it is believed desirable to develop a gas spring piston, as well as a gas spring assembly and method of assembly including the same, that are capable of providing improved engagement of the flexible wall with the gas spring piston, such as, for example, may be useful for providing improved sealing between the flexible wall and the gas spring piston, providing improved retention of the flexible wall on the gas spring piston (e.g., during use of the gas spring assembly under tension conditions), and/or overcoming other disadvantages of known constructions while maintaining a relatively low cost of manufacture and ease of assembly.

BRIEF DESCRIPTION

One example of a gas spring piston in accordance with the subject matter of the present disclosure that is dimensioned to receive an open end of an associated flexible wall can include a piston body having a longitudinal axis. The piston body can include a first piston end and a second piston end spaced longitudinally from the first piston end. A first side wall can extend circumferentially about the axis and longitudinally between the first and second piston ends. An end wall can extend transverse to the axis and interconnect with the first side wall. A second side wall can extend circumferentially about the axis and project longitudinally from the end wall in a direction opposite the first side wall. The second side wall can include an outer surface and a retainment ridge disposed in longitudinally-spaced relation to the end wall such that the outer surface is disposed between the retainment ridge and the end wall. The retainment ridge can project radially-outwardly beyond the outer surface such that a shoulder surface is formed adjacent the outer surface and extends radially-outwardly along the retainment ridge in approximate alignment with the end wall. The outer surface can include an engagement feature dimensioned to compressively engage the associated flexible wall. The engagement feature can be positioned along the outer surface in longitudinally-spaced relation to the end wall and the shoulder surface of the retainment ridge.

One example of a gas spring assembly in accordance with the subject matter of the present disclosure can include a flexible wall having a longitudinal axis and extending circumferentially about the axis and longitudinally between opposing first and second open ends such that the flexible wall at least partially defines a spring chamber. A first end member can be operatively connected across the first open end of the flexible wall such that a substantially fluid-tight seal is formed therewith. A gas spring piston can include an end wall extending transverse to the longitudinal axis, a first side wall extending longitudinally from the end wall in a first direction, and a second side wall extending longitudinally from the end wall in a second direction opposite the first direction. The second side wall can include a retainment ridge disposed in longitudinally-spaced relation to the end wall such that an outer surface of the second side wall is disposed therebetween. The retainment ridge can project radially-outwardly beyond the outer surface such that a shoulder surface is formed along the retainment ridge that is disposed in facing relation to the end wall. The outer surface can include a first surface portion disposed adjacent the end wall, a second surface portion disposed adjacent the shoulder surface and in longitudinally-spaced relation to the first surface portion, and a third surface portion disposed between the first and second surface portions. The third surface portion can at least partially define an engagement feature along the outer surface of the second side wall such that the engagement feature is positioned along the outer surface in longitudinally-spaced relation to the end wall and the shoulder surface of the retainment ridge. The second open end of the flexible wall can be received along the second side wall between the retainment ridge and the end wall such that the flexible wall compressively engages at least the engagement feature of the second side wall.

One example of a method of assembling a gas spring in accordance with the subject matter of the present disclosure can include providing a flexible wall that includes an open end and an end surface adjacent the open end. The method can also include providing a piston having a longitudinal axis. The piston can include an end wall disposed transverse to the axis, a first side wall that extends approximately longitudinally from the end wall in a first direction, and a second side wall that extends approximately longitudinally from the end wall in a second direction opposite the first direction. The second side wall can include a retainment ridge that extends circumferentially around the second side wall. The retainment ridge can include a shoulder surface facing the end wall. The second side wall can include an outer surface having a first surface portion disposed adjacent the end wall, a second surface portion disposed adjacent the shoulder surface and in longitudinally-spaced relation to the first surface, and a third surface portion disposed between the first and second surface portions. At least one of the first and second surface portions can define an outermost cross-sectional dimension of the outer surface. The third surface portion can at least partially define an engagement feature along the second side wall that is positioned between the first and second surface portions and in spaced relation to the end wall and the shoulder surface of the retainment ridge. The method can further include positioning the open end of the flexible wall adjacent the retainment ridge, and urging the open end of the flexible wall in an axial direction toward the end wall such that the open end is forced over the retainment ridge. The method can also include positioning the open end of the flexible wall along the second side wall such that such that the end surface of the flexible wall compressively engages at least the engagement feature of the second side wall.

DETAILED DESCRIPTION

Figure 1:
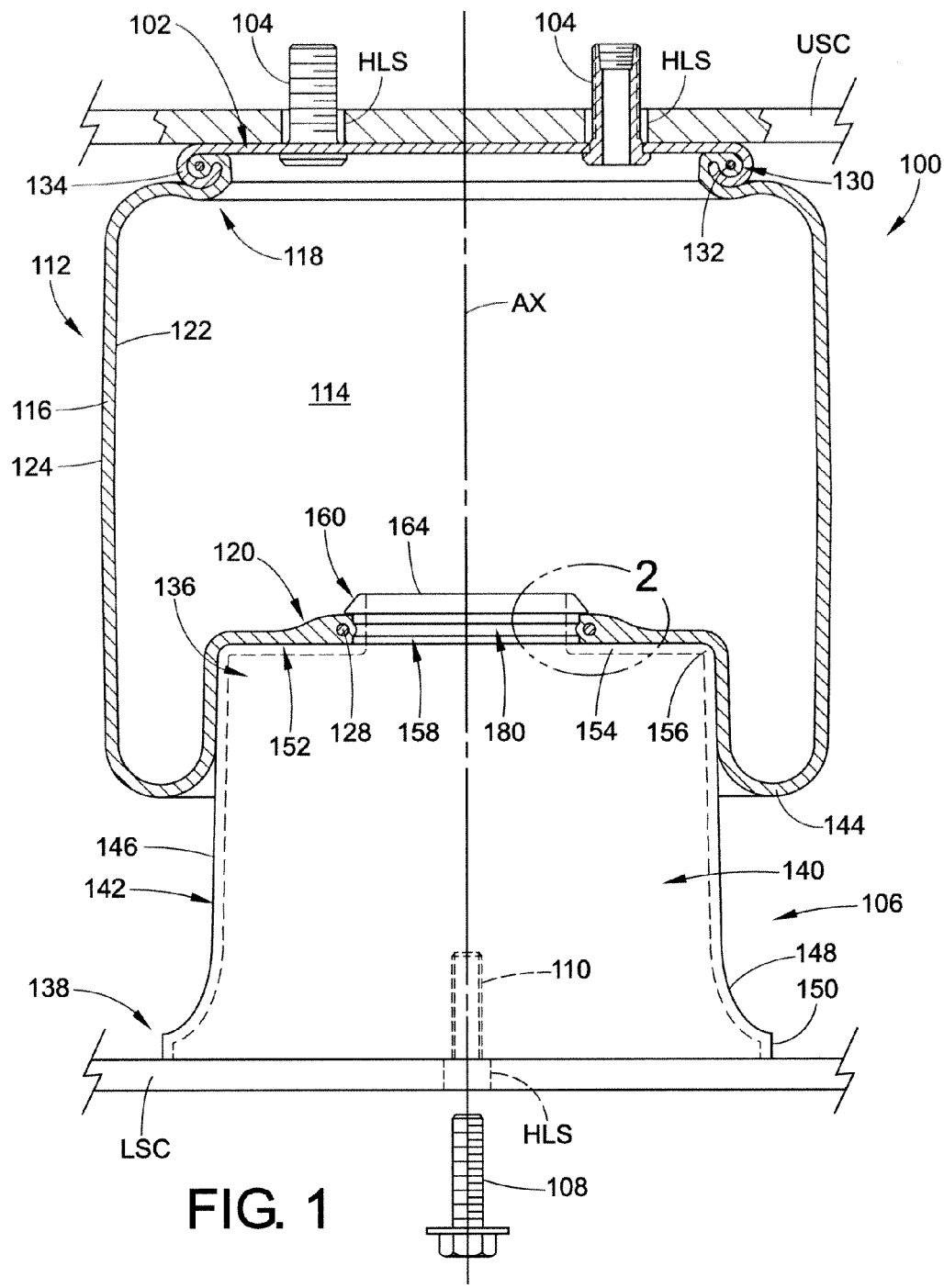
FIG. 1 is a side view, in partial cross section, of one example of a gas spring assembly that includes a gas spring piston in accordance with the subject matter of the present disclosure.

Turning, now, to the drawings wherein the showings are for the purpose of illustrating examples of the subject matter of the present disclosure and which are not intended as a limitation of the same, FIG. 1 illustrates one example of a gas spring assembly 100 disposed between opposing structural components, such as upper and lower structural components USC and LSC of an associated vehicle (not shown), for example. Gas spring assembly 100 is shown as having a longitudinal axis AX and includes a first end member, such as a top or bead plate 102, for example, that is adapted for securement on or along one of the structural components (e.g., upper structural component USC). It will be appreciated that the first end member can be secured along the structural component in any suitable manner, such as, for example, by using one or more threaded mounting studs 104 that extend through corresponding mounting holes HLS in one of the associated structural components (e.g., upper structural component USC).

Gas spring assembly 100 also includes an opposing second end member, such as a piston 106, for example, that is longitudinally spaced from the first end member and is adapted for securement on or along a different one of the structural components, such as lower structural component LSC, for example. Again, it will be appreciated that the second end member can be operatively connected to or otherwise secured on or along the structural component in any suitable manner, such as by using one or more threaded fasteners 108 to extend through mounting holes HLS in the associated structural component (e.g., lower structural component LSC) and threadably engage a corresponding mounting feature in the second end member, such as a threaded passage 110, for example.

Gas spring assembly 100 also includes a flexible sleeve or bellows 112 that is operatively connected between the first and second end members and at least partially defines a spring chamber 114 therebetween. In the exemplary arrangement shown in FIG. 1, flexible sleeve 112 includes a flexible wall 116 that extends between opposing first and second open ends 118 and 120. Flexible wall 116 includes an inside surface 122 that is in fluid communication with spring chamber 114 and an outside surface 124 that abuttingly engages piston 106. As can be better seen in FIGS. 2 and 3, flexible wall 116 also includes an end surface 126 that extends between and connects the inside and outside surfaces along second open end 120. It will be appreciated that flexible wall 116 can be formed in any suitable manner, such as, for example, by using one or more fabric-reinforced, elastomeric plies or layers (not shown) and one or more un-reinforced, elastomeric plies or layers (not shown). Optionally, an annular reinforcement member 128, such as a bead wire, for example, can be embedded within the flexible wall along second open end 120.

Returning to FIG. 1, first open end 118 can be secured on or along first end member 102 in any manner suitable for forming a substantially fluid-tight seal therewith. For example, flexible sleeve 112 can include a mounting bead 130 formed along first open end 118 that can, optionally, include an annular reinforcement member 132, such as a bead wire, for example, embedded therein with first end member 102 secured along or across the first open end of the flexible sleeve by capturing at least a portion of the mounting bead using a crimped edge connection 134.

Piston 106 extends longitudinally between a first or upper end 136 and a second or lower end 138. First end 136 is adapted to receive and form a substantially fluid-tight seal with second open end 120 of flexible sleeve 112. Second end 138 of piston 106 is adapted to abuttingly engage an associated structural component, such as lower structural component LSC, for example. Additionally, as discussed above, piston 106 can be secured on or along the associated structural component in any suitable manner, such as by using threaded fastener 108 and threaded passage 110, for example.

Piston 106 includes a piston body 140 and can also, optionally, include one or more additional components and/or elements, such as one or more threaded inserts (not shown), for example. The piston body has a first or outer side wall 142 that extends generally longitudinally between first and second ends 136 and 138. In use, flexible wall 116 of flexible sleeve 112 forms a rolling-lobe 144 that is displaced along first side wall 142 as the gas spring assembly undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of the piston assembly. As such, it will be appreciated that the profile of first side wall 142 is merely exemplary in that the same includes a first portion 146 having an approximately frusto-conical or tapered shape, a second wall portion 148 having a curvilinear shape, and a third portion 150 having an approximately cylindrical shape.

Figure 2:
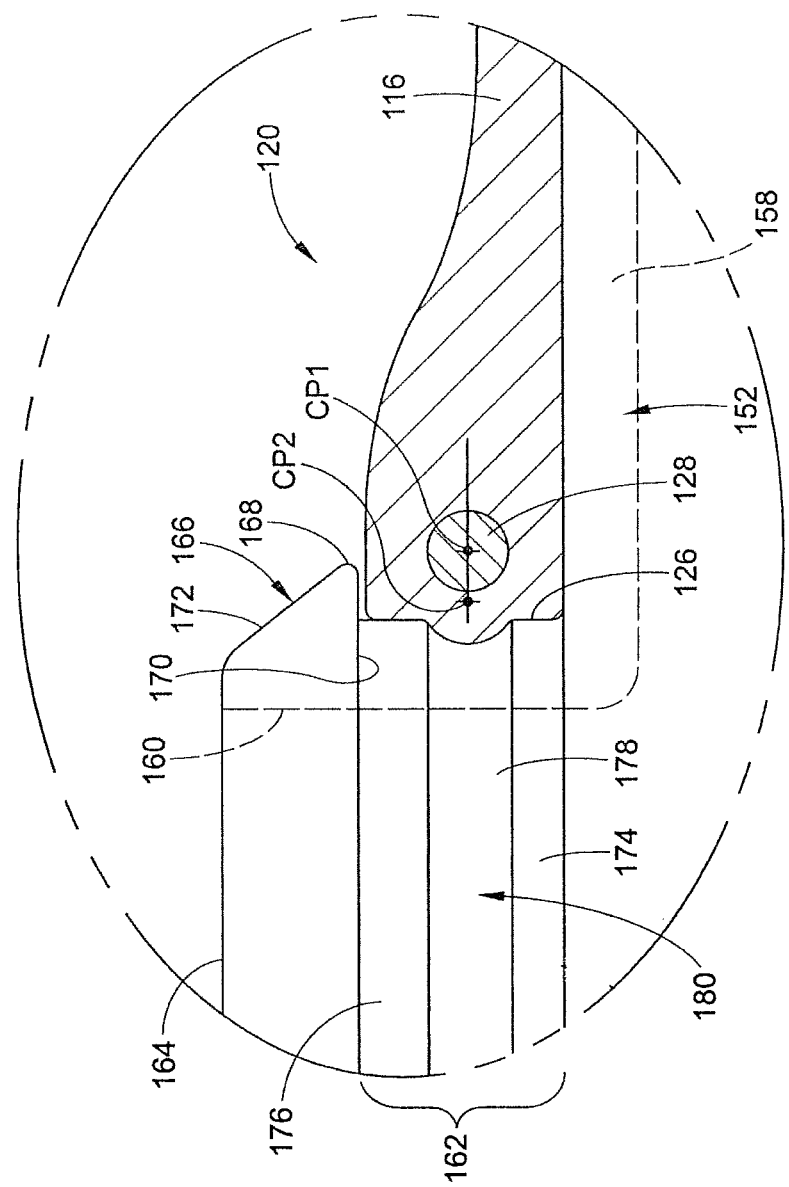
FIG. 2 is an enlarged cross-sectional view of the portion of the flexible wall and gas spring piston identified in Detail 2 of FIG. 1.
Figure 3:
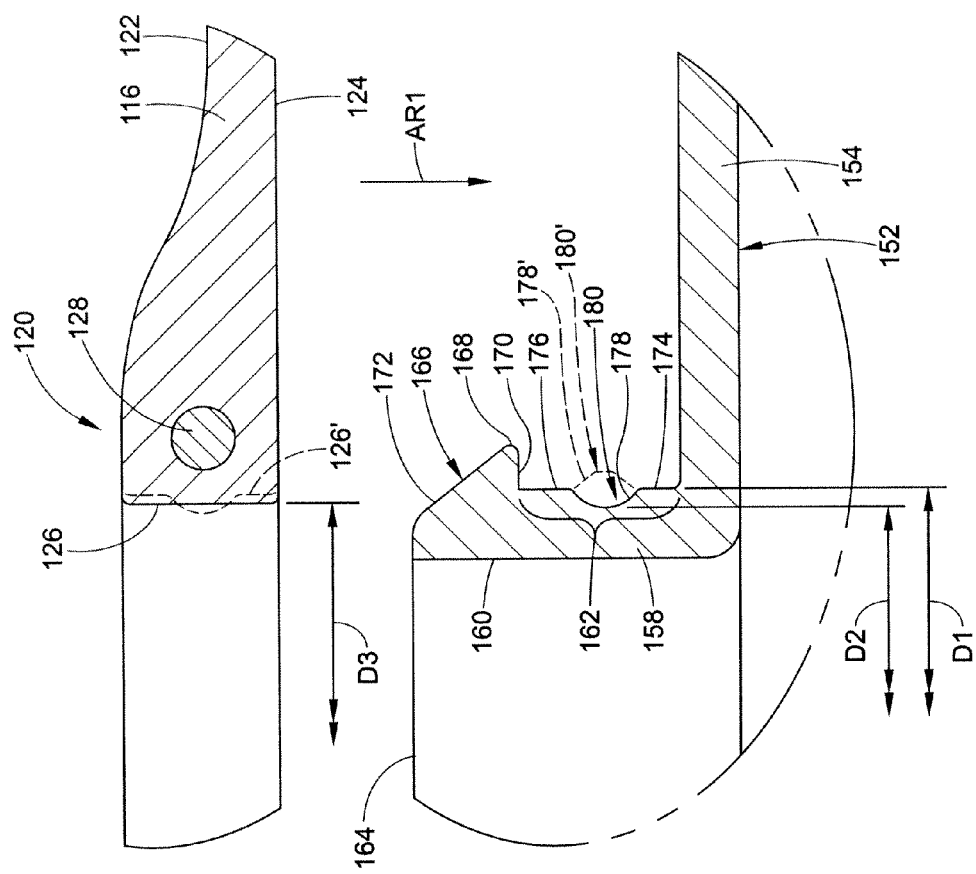
FIG. 3 is an exploded cross-sectional view of the portion of the flexible wall and gas spring piston in FIG. 2 prior to assembly.

Piston body 140 also includes a first or upper end wall 152 that extends circumferentially around axis AX and in an orientation that is generally transverse to first side wall 142. Additionally, first end wall 152 is shown in FIGS. 1-3 as including an approximately planar portion 154 that transitions into first side wall 142 at a curved or shoulder portion 156. It will be understood, however, that first end wall 152 can take any suitable shape, form and/or configuration. For example, shoulder portion 156 could have a larger or smaller radius and/or approximately planar portion 154 could be at least partially curved or otherwise contoured. Furthermore, the description of first end wall 152 as extending generally transverse to first side wall 142 is to be broadly interpreted. As one example, first end wall 152 could be approximately perpendicular to first side wall 142, such as is shown in FIGS. 1-3, for example. Recognizing, however, that the first side wall and first end wall can take a wide variety of shapes, contours, forms and/or configurations, a wide range of relative angular orientations should be interpreted as being generally transverse, such as a range of plus (+) or minus (−) 45 degrees from horizontal, for example.

As shown in FIGS. 1-3, piston body 140 further includes a second or inner side wall 158 that extends circumferentially around axis AX and in an orientation that is generally transverse, as previously defined, to first end wall 152. Second side wall 158 can take any suitable shape, form and/or configuration. As are more clearly illustrated in FIGS. 2 and 3, the second side wall can, for example, include approximately cylindrical inner and outer surfaces 160 and 162, and can have a longitudinal length dimension and extend in circumferentially continuously and substantially uniformly around axis AX at approximately the same longitudinal length dimension. Additionally, second side wall 158 can project from first end wall 152 in a direction generally opposite second end 136 of piston body 140 and terminate at a second end wall 164, which is shown as being approximately planar. However, it will be recognized that any alternate shape, form and/or configuration could be used.

Piston body 140 can also include a retainment ridge 166 that extend circumferentially around axis AX and project radially-outwardly from second side wall 158. In the exemplary embodiment shown in FIGS. 1-3, retainment ridge 166 includes an outermost edge 168 and a shoulder surface 170 that extends circumferentially around axis AX and radially outwardly from outer surface 162 of second side wall 158 to outermost edge 168. Additionally, shoulder surface 170 is disposed in facing relation to first end wall 152 and extends radially outwardly in generally transverse relation, as previously defined, to second side wall 158. Retainment ridge 166 also includes an outer surface 172 that extends generally circumferentially around axis AX and is oriented in a direction facing radially-outwardly and generally away from first end wall 152.

The second side wall of a gas spring piston in accordance with the subject matter of the present disclosure also includes one or more engagement features formed along an outer surface thereof and adapted to operatively interengage a portion of the flexible sleeve or bellows. Such one or more engagement features can be substantially continuous (e.g., annular) or include two or more segments disposed in circumferentially spaced relation to one another along the second side wall. Additionally, such one or more engagement features can extend into the second side wall (e.g., concave), project out of the second side wall (e.g., convex), or any combination thereof. Furthermore, such one or more engagement features can be of any suitable size, shape, form or configuration (e.g., approximately U-shaped or approximately V-shaped).

In the exemplary arrangement in FIGS. 1-3, outer surface 162 of second side wall 158 is shown as including a plurality of surface portions that are arranged in longitudinal relation with respect to one another. A surface portion 174 is disposed toward first end wall 152 and a surface portion 176 is disposed in longitudinally-spaced relation to surface portion 174 in a direction toward shoulder surface 170 such that a surface portion 178 is disposed therebetween. Surface portions 174 and 176 are shown as being approximately cylindrical in shape and extending continuously about the periphery of second side wall 158. Surface portion 178 is shown as including a curvilinear cross-sectional shape that at least partially defines a groove 180 that operates as an engagement feature in accordance with the subject matter of the present disclosure. It will be appreciated, however, that another shape and/or configuration for surface portion 178 could alternately be used, as discussed above. For example, surface portion 178', which is represented as a dashed line in FIG. 3, could project radially-outwardly from surface portions 174 and 176 and form a rib 180' (FIG. 3) extending at least partially about the periphery of the second side wall. Alternately, a plurality of rib portions (not shown) could be spaced apart from one another about the periphery of the second side wall.

As shown in FIG. 3, outer surface 162 includes an outermost cross-sectional dimension D1, such as, for example, may be established by one or more of surface portions 174 and 176. Surface portion 178 extends radially-inwardly into second side wall 158 from along surface portions 174 and 176, and, thus, defines an engagement feature having an innermost cross-sectional dimension D2 that is less than outermost cross-sectional dimension D1. Additionally, it will be recognized that surface portion 178 is disposed longitudinally along outer surface 162 in spaced relation to both first end wall 152 and shoulder surface 170 of retainment ridge 166 such that at least some of surface portion 174 and surface portion 176 is disposed between surface portion 178 and the first end wall and the shoulder surface, respectively.

Second open end 120 is adapted to be received along outer surface 162 of second side wall 158. In a preferred embodiment, end surface 126 will have a cross-sectional dimension D3 that is less than at least cross-sectional dimension D1 of second side wall 152. In such case, second open end 120 of flexible wall 116 can be forced over or otherwise assembled over retainment ridge 166 and onto second side wall 158, as is represented by arrow AR1 in FIG. 3, such that end surface 126 compressively engages at least surface portions 174 and 176 of outer surface 162. It is anticipated that at least a portion of the material forming second open end 120 of flexible wall 116, such as the material adjacent end surface 126, for example, will flow or otherwise be deformed into compressive engagement with surface portion 178 that at least partially forms groove 180. In particular, at least a portion of the material forming the second open end of the flexible wall would be expected to compressively engage surface portion 178 in conditions in which reinforcement member 128 is disposed in approximate longitudinal alignment with groove 180, such as is shown in FIG. 3 by centerpoints CP1 and CP2. In such an arrangement, end surface 126 would be expected to adopt a cross-sectional profile having approximately the cross-sectional profile of outer surface 162, such as is represented in FIG. 3 by dashed line 126', for example.

The flow or other deformation of the material of the flexible wall adjacent end surface 126 of second open end 120 into compressive engagement with surface portion 178 of outer surface 162 can be achieved in any suitable manner, such as by making the opening that is at least partially defined by end surface 126 that extends through second open end 120 somewhat smaller in size than that of outer surface 162 of second side wall 158. In such case, the relative difference in sizes can generate a compressive or interference fit between the two components resulting in material displacement into groove 180.

Additionally, it is well understood that reinforcement members, such as reinforcement members 128 and 130 are substantially inelastic in comparison with the material from which flexible wall 116 is at least partially formed. For example, reinforcement members 128 and 130 can be formed from an endless ring of wound metallic wire (e.g., steel) or solid metallic wire (e.g., steel). Whereas, the elastomeric material from which flexible wall 116 is at least partially formed can include one or more plies, layers or other masses of synthetic rubber, natural rubber and/or thermoplastic elastomer. Due, at least in part, to the comparative differences in elasticity of the reinforcement member and the elastomeric material of the flexible wall, material adjacent reinforcement member 128 would be expected to compressively engage surface portion 178 of outer surface 162 under conditions in which reinforcement member 128 is at least approximately aligned with groove 180.

Piston body 140 can be formed from any suitable material or combination of materials for providing the desired strength and retention properties of piston 106. Examples of materials that may be suitable for use in forming the piston body can include fiber-reinforced thermoplastics, such as glass (or other) fiber-reinforced polypropylene and glass (or other) fiber-reinforced polyamide, for example, and high-strength (unfilled) thermoplastics, such as polyester, polyethylene and polyether or any combination thereof, for example.

As used herein with reference to certain elements, components and/or structures, numerical ordinals (e.g., "first end" and "second end") merely denote different singles of a plurality and do not imply any order or sequence unless specifically defined by the claim language. Furthermore, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring piston dimensioned to receive an open end of an associated flexible wall, said gas spring piston comprising:
a piston body having a longitudinal axis and including:
a first piston end;
a second piston end spaced longitudinally from said first piston end;
a first side wall extending circumferentially about said axis and longitudinally between said first and second piston ends;
an end wall extending transverse to said axis and interconnecting with said first side wall; and,
a second side wall extending circumferentially about said axis and projecting longitudinally from said end wall in a direction opposite said first side wall, said second side wall including an outer surface and a retainment ridge disposed in longitudinally-spaced relation to said end wall such that said outer surface is disposed between said retainment ridge and said end wall, said retainment ridge projecting radially-outwardly beyond said outer surface such that a shoulder surface is formed adjacent said outer surface and extends radially-outwardly along said retainment ridge in approximate alignment with said end wall, said outer surface including an engagement feature dimensioned to compressively engage an end surface of the associated flexible wall, said engagement feature being positioned along said outer surface in longitudinally-spaced relation to said end wall and said shoulder surface of said retainment ridge,
wherein said engagement feature includes a groove extending radially-inwardly into said second side wall, said outer surface includes a first surface portion disposed between said end wall and said engagement feature, a second surface portion disposed between said shoulder surface and said engagement feature, and a third surface portion disposed between said first and second surface portions with said third surface portion at least partially defining said groove of said engagement feature, and wherein said third portion includes a curvilinear cross-sectional profile extending into said second side wall in a concave orientation and at least partially forms said groove of said engagement feature, and wherein said first and second surface portions have a linear cross-sectional profile and extend respectively between said end wall and said engagement feature and said shoulder and said engagement feature, said first, second and third surface portions defining the entirety of said outer surface between said shoulder surface and said end wall.

2. A gas spring piston according to claim 1, wherein said outer surface includes a first surface portion disposed between said end wall and said engagement feature and a second surface portion disposed between said shoulder surface and said engagement feature such that said engagement feature is disposed in longitudinally-spaced relation to said end wall and said shoulder surface.

3. A gas spring piston according to claim 2, wherein at least one of said first and second surface portions defines an outermost peripheral extent of said outer surface.

4. A gas spring piston according to claim 2, wherein at least one of said first and second surface portions has a substantially cylindrical outer peripheral shape.

5. A gas spring piston according to claim 4, wherein each of said first and second surface portions has a substantially cylindrical outer peripheral shape.

6. A gas spring piston according to claim 1, wherein said engagement feature includes a groove extending radially-inwardly into said second side wall.

7. A gas spring piston according to claim 6, wherein said groove extends substantially-continuously around said axis along said outer surface of said second side wall.

8. A gas spring assembly comprising:
a flexible wall having a longitudinal axis and extending circumferentially about said axis and longitudinally between opposing first and second open ends such that said flexible wall at least partially defines a spring chamber, said flexible wall including an inside surface, an outside surface, and an end surface extending between and connecting said inside surface and said outside surface;
a first end member operatively connected across said first open end of said flexible wall such that a substantially fluid-tight seal is formed therewith; and,
a gas spring piston including an end wall extending transverse to said longitudinal axis, a first side wall extending longitudinally from said end wall in a first direction, and a second side wall extending longitudinally from said end wall in a second direction opposite said first direction;
said second side wall including a retainment ridge disposed in longitudinally-spaced relation to said end wall such that an outer surface of said second side wall is disposed therebetween, said retainment ridge projecting radially-outwardly beyond said outer surface such that a shoulder surface is formed along said retainment ridge that is disposed in facing relation to said end wall, said outer surface including a first surface portion disposed adjacent said end wall, a second surface portion disposed adjacent said shoulder surface and in longitudinally-spaced relation to said first surface portion, and a third surface portion disposed between said first and second surface portions, said third surface portion at least partially defining an engagement feature along said outer surface of said second side wall such that said engagement feature is positioned along said outer surface in longitudinally-spaced relation to said end wall and said shoulder surface of said retainment ridge, said first, second and third surface portions defining the entirety of said outer surface between said shoulder surface and said end wall;
said second open end of said flexible wall received along said second side wall between said retainment ridge and said end wall such that said end surface of said flexible wall compressively engages at least said engagement feature of said second side wall and said outside surface of said flexible wall engages said end wall.

9. A gas spring assembly according to claim 8, wherein said flexible wall includes a reinforcement member at least partially embedded therein adjacent said second open end, and said second open end being positioned along said outer surface of said second side wall such that said reinforcement member is at least approximately aligned with said engagement feature.

10. A gas spring assembly according to claim 9, wherein said third surface portion has a concave cross-sectional shape extending radially-inwardly into said second side wall such that said engagement feature includes a groove extending at least partially around said outer surface.

11. A gas spring assembly according to claim 10, wherein said groove is an endless annular groove that extends circumferentially about said axis along said outer surface.

12. A gas spring assembly according to claim 10, wherein said third surface portion has a cross-sectional centerpoint, said reinforcement member has a cross-sectional centerpoint, and said reinforcement member is positioned along said second side wall such that said centerpoint of said reinforcement member is substantially-longitudinally aligned with said centerpoint of said third surface portion.

13. A gas spring assembly according to claim 12, wherein said flexible wall is in abutting engagement with said end wall when in said substantially-longitudinally aligned position.

14. A gas spring assembly according to claim 8, wherein said second side wall includes an inner surface spaced radially-inwardly from said outer surface and extending longitudinally from along said end wall in approximately said second direction.

15. A method of assembling a gas spring, said method comprising the steps of:
step a) providing a flexible wall that includes an open end and an inside surface, an outside surface and an end surface adjacent said open end and extending between said inside surface and said outside surface;
step b) providing a piston having a longitudinal axis and including:
an end wall disposed transverse to said axis;
a first side wall extending approximately longitudinally from said end wall in a first direction; and,
a second side wall extending approximately longitudinally from said end wall in a second direction opposite said first direction and including a retainment ridge extending circumferentially around said second side wall, said retainment ridge including a shoulder surface facing said end wall;
said second side wall including an outer surface having a first surface portion disposed adjacent said end wall, a second surface portion disposed adjacent said shoulder surface and in longitudinally-spaced relation to said first surface, and a third surface portion disposed between said first and second surface portions, said first, second and third surface portions defining the entirety of said outer surface between said shoulder surface and said end wall;
at least one of said first and second surface portions defining an outermost cross-sectional dimension of said outer surface, said third surface portion at least partially defining an engagement feature along said second side wall that is positioned between said first and second surface portions and in spaced relation to said end wall and said shoulder surface of said retainment ridge;
step c) positioning said open end of said flexible wall adjacent said retainment ridge;
step d) urging said open end of said flexible wall in an axial direction toward said end wall such that said open end is forced over said retainment ridge;
step e) positioning said open end of said flexible wall along said second side wall such that said end surface of said flexible wall compressively engages at least said engagement feature of said second side wall and said outside surface engages said end wall.

16. A method according to claim 15, wherein providing a flexible wall in step a) includes providing a flexible wall that includes a reinforcement member at least partially embedded within said flexible wall adjacent said open end, and positioning said open end in step e) includes positioning said open end of said flexible wall along said second side wall such that said reinforcement member is at least approximately longitudinally aligned with said engagement feature along said second side wall.

17. A method according to claim 15, wherein providing a piston in step b) includes providing a third surface portion having a concave cross-sectional shape extending radially-inwardly into said second side wall such that said engagement feature includes a groove extending at least partially around said outer surface.

18. A method according to claim 15, wherein providing a flexible wall in step a) includes providing a flexible wall that includes an end surface along said open end having a wall surface profile, providing a piston in step b) includes providing a piston in which said outer surface includes an outer surface profile, and positioning said open end of said flexible wall along said second side wall in e) includes positioning said open end includes aligning said open end with said engagement feature such that said end surface of said flexible wall is deformed from said wall surface profile into substantial conformity with said outer surface profile.

* * * * *